(12) United States Patent
Sekiya et al.

(10) Patent No.: US 9,005,394 B2
(45) Date of Patent: Apr. 14, 2015

(54) ANTI-SOILING AGENT COMPOSITION

(75) Inventors: Hiroshi Sekiya, Tokyo (JP); Hiraku Sawada, Shizuoka (JP)

(73) Assignee: Maintech Co., Ltd., Tokyo (JP)

( * ) Notice: Subject to any disclaimer, the term of this patent is extended or adjusted under 35 U.S.C. 154(b) by 0 days.

(21) Appl. No.: 13/497,577

(22) PCT Filed: Jun. 10, 2011

(86) PCT No.: PCT/JP2011/003322
§ 371 (c)(1),
(2), (4) Date: Mar. 22, 2012

(87) PCT Pub. No.: WO2012/168986
PCT Pub. Date: Dec. 13, 2012

(65) Prior Publication Data
US 2014/0206805 A1    Jul. 24, 2014

(51) Int. Cl.
| | | |
|---|---|---|
| *B08B 17/00* | (2006.01) | |
| *B32B 27/28* | (2006.01) | |
| *D21H 17/13* | (2006.01) | |
| *D21H 17/59* | (2006.01) | |
| *D21H 19/32* | (2006.01) | |
| *D06M 15/643* | (2006.01) | |
| *D21H 21/04* | (2006.01) | |
| *C08L 83/08* | (2006.01) | |
| *C09D 183/08* | (2006.01) | |
| *C08G 77/388* | (2006.01) | |

(52) U.S. Cl.
CPC ............ *B08B 17/00* (2013.01); *B08B 2220/01* (2013.01); *B32B 27/283* (2013.01); *D21H 17/13* (2013.01); *D21H 17/59* (2013.01); *D21H 19/32* (2013.01); *C08G 77/388* (2013.01); *D06M 15/6436* (2013.01); *D21H 21/04* (2013.01); *C08L 83/08* (2013.01); *C09D 183/08* (2013.01)

(58) Field of Classification Search
None
See application file for complete search history.

(56) References Cited

U.S. PATENT DOCUMENTS

2006/0162888 A1    7/2006  Sekiya et al.

FOREIGN PATENT DOCUMENTS

| DE | 101 22 626 A1 * | 6/2002 |
|---|---|---|
| EP | 577 039 A1 * | 6/1993 |
| JP | 07-292382 A | 11/1995 |
| JP | 08-049185 A | 2/1996 |
| JP | 11-217786 A | 8/1999 |
| JP | 2002-256214 A | 9/2002 |
| JP | 2003-213587 A | 7/2003 |
| JP | 2004-098306 A | 4/2004 |
| JP | 2010-100697 A | 5/2010 |
| WO | WO 2010/047409 A1 | 4/2010 |

OTHER PUBLICATIONS

Machine-generated translation of DE 101 22 626 Al into English (no date).*
Copy of International Search Report and Written Opinion mailed on Aug. 9, 2011 for the corresponding International patent application No. PCT/JP2011/003322.
Office Action dated Sep. 26, 2011 issued in corresponding JP application No. 2011-535815 (English translation attached).
Notice of Allowance dated Nov. 9, 2011 issued in corresponding JP application No. 2011-535815 (English translation attached).

* cited by examiner

*Primary Examiner* — Marc Zimmer
(74) *Attorney, Agent, or Firm* — Muncy, Geissler, Olds & Lowe, P.C.

(57) ABSTRACT

[Object] To provide an anti-soiling agent compound that can sufficiently prevents adhesion of pitch to a dry part region.

[Solution] The present invention provides an anti-soiling agent composition for preventing pitch contamination in a dry part of a paper-making process, and the composition has a polysiloxane compound represented by the following formula (1), wherein the number of amino-modified groups per molecule of the polysiloxane compound is in a range from 0.5 to 5.

[wherein, a substituent $R^1$ represents a methyl group or an amino-modified group represented by the following formula (2), and the number n of repeating siloxane units represents an integer in a range from 50 to 1000, and wherein, each of a substituent $R^2$ and a substituent $R^3$ independently represents an alkylene group having carbon atoms of 1 to 6, and the number m of repeating amino-alkylene units represents an integer in a range from 0 to 2].

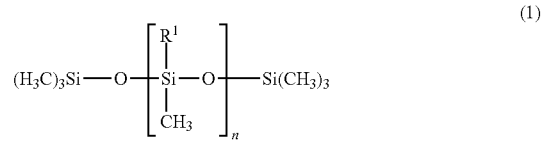

(1)

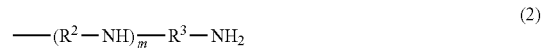

(2)

3 Claims, 1 Drawing Sheet

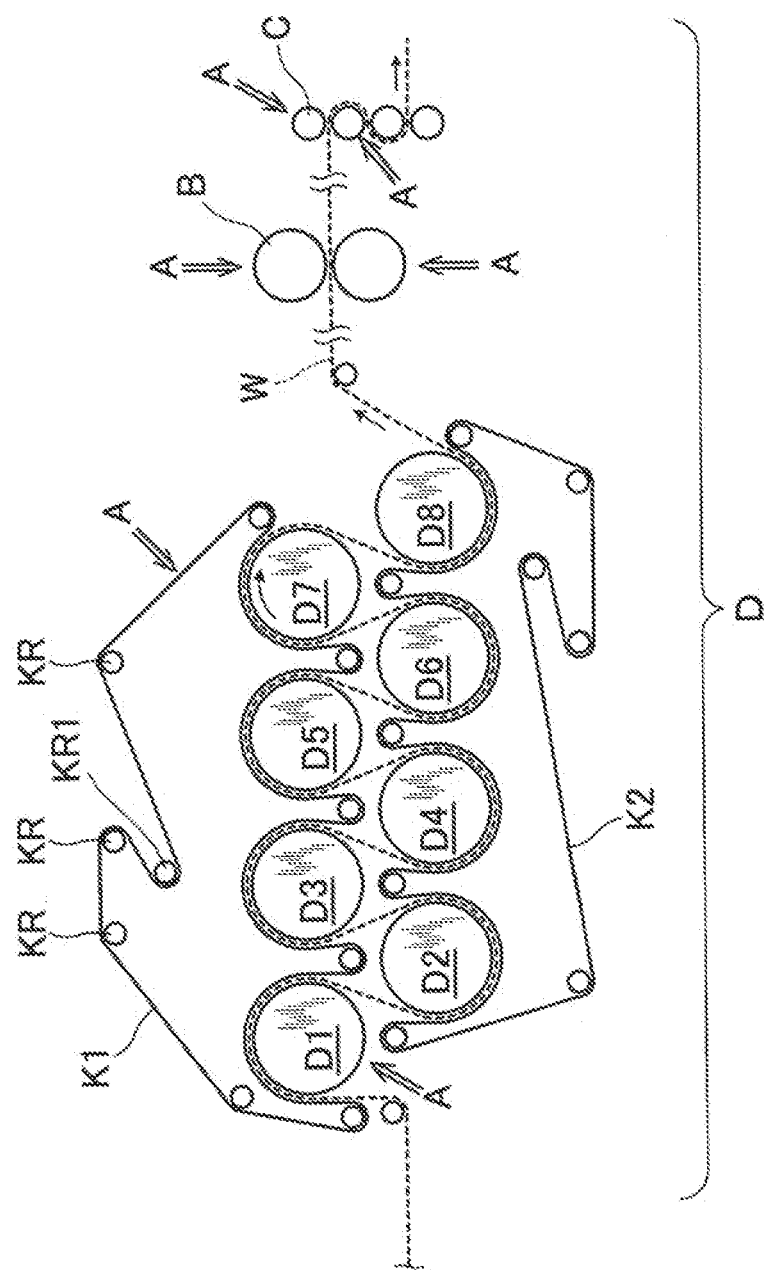

ANTI-SOILING AGENT COMPOSITION

The present application is a U.S. national stage of PCT/JP2011/003322 filed on Jun. 10, 2011, whose Japanese national stage application is Japanese Patent Application No. JP 2011-535815, also filed on Jun. 10, 2011, allowed on Nov. 9, 2011 and issued on Nov. 25, 2011 as Japanese Patent No. 4868628, the disclosure of which is incorporated herein by reference.

This application is also related to the following PCT U.S. national stage application that was filed on the same day as the present application: U.S. application Ser. No. 13/497,581, entitled ANTI-SOILING AGENT COMPOSITION.

TECHNICAL FIELD

The present invention relates to an anti-soiling agent composition, and more specifically concerns such an anti-soiling agent composition as to sufficiently prevent pitch contamination in a dry part.

BACKGROUND ART

A paper-making process for producing paper is generally provided with a wire part in which a liquid prepared by dispersing pulp fibers in water is mounted on a net (wire) for paper making so that excessive water is allowed to naturally drop down so as to prepare wet paper, a press part that allows the wet paper to pass between paired press rolls so that by pressing it between the pressing rolls with a felt being interpolated therebetween so as to transfer moisture in the wet paper onto the felt so that the wet paper is dehydrated, a dry part that makes the wet paper that has passed through the press part in contact with a heated cylinder to be dried to form paper, and a reel part that winds and takes up the paper onto a rod referred to as a spool.

In the dry part, a problem is raised in that pitch tend to adhere to the surface of each of a cylinder, a canvas, a calender roll, a breaker stack roll, etc. (which are collectively referred to as "dry part region"). When the pitch adheres to these, paper is contaminated, resulting in serious degradation of the yield.

In view of this problem, a stain adhesion preventive agent for preventing the pitch adhesion has been known (for example, see Patent Document 1). Such a stain adhesion preventive agent has a composition containing a silicone oil and a fluorine-based surfactant whose viscosities are different from each other.

Moreover, an anti-soiling agent composition for a paper-making machine, which is supplied and applied to a paper-making machine, and mainly composed of a side-chain type modified silicone oil or a side-chain/two-terminal type modified silicone oil, has been known (see Patent Document 2). In this anti-soiling agent composition, the side-chain type modified silicone oil has its side chains substituted with an amino group or an epoxy group.

PRIOR ART DOCUMENTS

[Patent Document 1] Japanese Patent Application Laid-Open Published No. 7-292382
[Patent Document 2] Japanese patent No. 3388450

DISCLOSURE OF THE INVENTION

Problems to be Solved by the Invention

In the stain adhesion preventive agent described in Patent Document 1, however, since the viscosity of the mixed silicone oil is too high, and since the silicone oil itself exerts stickiness, it is not possible to sufficiently prevent adhesion of pitch to the dry part regions.

Moreover, since the anti-soiling agent composition described in Patent Document 2 exerts a high fixability to the roll or the like of a paper-making machine, it is possible to give mold-releasing and water-repellant properties to a roll or the like immediately after the application thereto; however, depending on the structure of an amino modified group and the number of amino modified groups per molecule of a polysiloxane compound, it is not possible to sufficiently prevent adhesion of pitch to the dry part regions.

In view of the above-mentioned circumstances, the present invention has been devised, and its object is to provide an anti-soiling agent composition that can sufficiently prevent pitch from adhering to the dry part regions.

Means for Solving the Problem

In order to solve the above-mentioned problems, the present inventors have extensively studied and found that by using a polysiloxane compound having a predetermined amount of an amino-modified group having a predetermined structure, the above-mentioned problems can be solved, and have completed the present invention.

The present invention relates to (1) an anti-soiling agent compound for preventing pitch contamination onto a dry part of a paper-making process, which contains a polysiloxane compound represented by the following formula (1), in which the number of amino-modified groups per molecule of polysiloxane compound is in a range from 0.5 to 5.

[Formula 1]

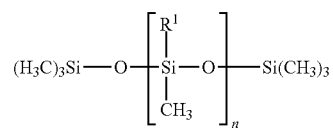

[wherein, substituent $R^1$ represents a methyl group or an amino-modified group represented by the following formula (2), and the number n of repeating siloxane units represents an integer in a range from 50 to 1000.

[Formula 2]

wherein, each of substituent $R^2$ and substituent $R^3$ independently represents an alkylene group having carbon atoms of 1 to 6, the number m of repeating amino-alkylene units represents an integer in a range from 0 to 2].

The present invention also relates to (2) the anti-soiling agent composition described in the (1) in which the number m of repeating amino-alkylene units in the amino-modified group represented by the formula (2) is 1.

The present invention also relates to (3) the anti-soiling agent composition described in the (1) or (2) in which in the amino-modified group represented by the formula (2), each of substituent $R^2$ and substituent $R^3$ independently represents an ethylene group or a propylene group.

The present invention also relates to (4) the anti-soiling agent composition described in the (1) or (2) in which in the amino-modified group represented by the formula (2), the substituent $R^2$ is a propylene group and substituent $R^3$ is an ethylene group.

The present invention also relates to (5) the anti-soiling agent composition described in any one of the (1) to (4) in which in the polysiloxane compound represented by the formula (1), the number n of repeating siloxane units represents an integer in a range from 100 to 800.

The present invention also relates to (6) the anti-soiling agent composition described in any one of the (1) to (5) in which the number of amino-modified groups per molecule of the polysiloxane compound is in a range from 0.5 to 3.

Effect of the Invention

In the anti-soiling agent composition of the present invention, the polysiloxane compound, represented by formula (1), with the number of amino-modified groups per molecule being set to 0.5 to 5, in which the amino-modified group has a structure represented by formula (2), makes it possible to form a coat film on a dry part region, and also to exert a function for dispersing pitch. For this reason, an anti-soiling agent containing the polysiloxane compound makes it possible to sufficiently prevent pitch from adhering to the dry part region, when applied to the dry part region. Additionally, in the present specification, the pitch includes adhesive solid matters, aggregates of paper powder, etc, generated in the paper-making process.

In particular, when the repeating number n of the siloxane units of the polysiloxane compound represented by formula (1) is set to an integer in a range from 50 to 1000, the coat film is easily formed on the dry part region, and by preparing the substituent $R^2$ and substituent $R^3$ in the amino modified group represented by formula (2) independently as an alkylene group having carbon atoms from 1 to 6, with the repeating number m of amino-alkylene units being set to an integer of 0 to 2, it becomes possible to disperse the pitch.

In the anti-soiling agent composition of the present invention, in the case when the repeating number m of the amino-alkylene units in the amino-modified group represented by formula (2) is 1, and/or in the case when each of the substituent $R^2$ and substituent $R^3$ in the amino modified group is independently prepared as an ethylene group or a propylene group, the dispersing effect of pitch is further improved.

BRIEF DESCRIPTION OF THE DRAWINGS

FIG. 1 is a schematic view that illustrates a dry part region of a dry part to which the anti-soiling agent composition of the present invention is applied.

MODE FOR CARRYING OUT THE INVENTION

Referring to FIGURE on demand, the following description will discuss preferable embodiments of the present invention in detail. Additionally, the positional relationships between upper and lower sides as well as between right and left sides are defined as the positional relationships shown in the FIGURE, unless otherwise indicated. Moreover, the dimensional ratios of the drawing are not limited by the ratios shown in the drawing.

The anti-soiling agent composition in accordance with the present embodiment contains a polysiloxane compound, an emulsifier and water.

When the anti-soiling agent composition in accordance with the present invention is applied to a dry part region, a coat film is formed on the dry part region so that a dispersing function for the pitch is exerted. For this reason, the anti-soiling agent composition makes it possible to sufficiently prevent the pitch from adhering to the dry part region.

The above-mentioned polysiloxane compound is represented by the following formula (1).

[Formula 3]

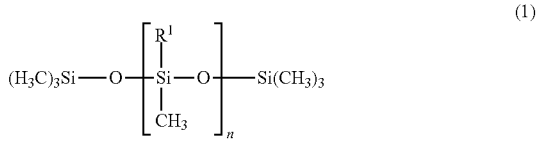

In the polysiloxane compound represented by formula (1), a substituent $R^1$ is a methyl group or an amino-modified group. Additionally, the methyl group and the amino-modified group may be mixed in one molecule of the polysiloxane compound. Moreover, a polysiloxane compound in which all the substituents $R^1$ are methyl groups and a polysiloxane compound in which at least one of the substituents $R^1$ is an amino-modified group may be used in a mixed manner.

The amino-modified group is represented by the following formula (2).

[Formula 4]

In this case, in the amino-modified group represented by formula (2), each of substituent $R^2$ and substituent $R^3$ is independently prepared as an alkylene group having carbon atoms of from 1 to 6. This structure makes it possible to positively disperse the pitch.

Among these, each of the substituent $R^2$ and substituent $R^3$ in the amino modified group is preferably prepared as an ethylene group or a propylene group independently. By setting the number of carbon chains to 2 to 3, the dispersing effects for the pitch is further improved.

Moreover, the substituent $R^2$ and substituent $R^3$ are preferably prepared as mutually different alkylene groups, and more specifically, the substituent $R^2$ is a propylene group and the substituent $R^3$ is preferably an ethylene group.

In the amino-modified group represented by formula (2), the repeating number m of amino-alkylene units is an integer of from 0 to 2. In the case when the repeating number m of amino-alkylene units is 0, the amino-modified group has no substituent $R^2$.

When the repeating number m of amino-alkylene units exceeds 3, the effect for dispersing pitch becomes insufficient.

Among these, the repeating number m of amino-alkylene units in the amino-modified group is preferably set to 1.

In the anti-soiling agent composition, the number of amino-modified groups per molecule of a polysiloxane compound is from 0.5 to 5, and preferably, from 0.5 to 3.

In the case when the number of amino-modified groups is less than 0.5, no effect for dispersing pitch can be obtained. Moreover, when the number of amino-modified groups exceeds 5, the ionizing property becomes higher, and since excessive ions are accumulated on the surface of the dry part region, stickiness on the surface becomes higher, causing a problem in that more pitch easily adheres thereto.

In the present specification, "the number of amino-modified groups per molecule" refers to an average number of amino-modified groups contained in one molecule, which more specifically represents a value obtained by dividing the total number of amino-modified groups by the number of the molecules. That is, in the case when the number of amino-modified groups per molecule is 0.1, this means that the total number of amino-modified groups contained in 10 molecules is one.

In the polysiloxane compound represented by formula (1), the repeating number n of siloxane units is an integer of from 50 to 1000, and more preferably an integer of from 100 to 800.

In the case when the repeating number n of the siloxane units is less than 50, a coat film formation onto the dry part region becomes insufficient, and when the repeating number n of the siloxane units exceeds 1000, the polysiloxane compound having a high viscosity becomes sticky and adheres to the surface of the dry part region, causing a problem in that more pitch easily adheres thereto.

The kinematic viscosity at 25° C. of a polysiloxane compound is preferably 20000 $mm^2/s$ or less, and more preferably, 10000 $mm^2/s$ or less.

When the kinematic viscosity exceeds 20000 $mm^2/s$, it becomes difficult to sufficiently disperse pitch in comparison with the structure in which the kinematic viscosity is set within the above-mentioned range. Moreover, stickiness increases to cause more pitch adhere thereto.

The anti-soiling agent composition according to the present embodiment contains an emulsifier.

When an emulsifier is contained therein, the polysiloxane compound is allowed to have an improved emulsification stability.

Examples of the emulsifier include surfactants that emulsify the polysiloxane compound.

Among these, the emulsifier is preferably prepared as a nonionic surfactant, and more preferably as polyethylene decyl ether, polyethylene cetyl ether, or polyethylene stearyl ether.

In the case when the emulsifier is prepared as any of these compounds, the resulting polysiloxane compound not only has an improved emulsification stability, but also prevents discoloration of paper.

In the case when colored paper such as a corrugated cardboard is produced by a paper-making machine, if polyethylene alkyl ether having a low-molecular-weight alkyl group is used as an emulsifier, the color of paper is separated to cause a problem of discolored spots. However, when polyethylene alkyl ether having a decyl group, a cetyl group or a stearyl group as an alkyl group is used as the emulsifier, discoloration can be suppressed.

In the anti-soiling agent composition, the compounding ratio of a polysiloxane compound is preferably set to 0.1 to 40% by weight, and more preferably, to 2.0 to 20% by weight, from the viewpoint of preventing pitch adhesion.

In the case when the compounding ratio of a polysiloxane compound is less than 0.1% by weight, the anti-soiling agent composition itself tends to be absorbed into wet paper prior to evaporation of moisture from the anti-soiling agent composition, in comparison with a structure in which the compounding ratio of the polysiloxane compound is set within the above-mentioned range, occasionally failing to sufficiently form a coat film. In contrast, in the case when the compounding ratio of a polysiloxane compound exceeds 40% by weight, the viscosity of the anti-soiling agent composition itself becomes higher, in comparison with a structure in which the compounding ratio within the above-mentioned range, making it difficult to being uniformly dispersed on the surface of the dry part region, and causing a high tacking characteristic with the result that the paper surface might have wrinkles.

The compounding ratio of an emulsifier to 1 part by weight of a polysiloxane compound is preferably set from 0.05 to 0.4 parts by weight, and more preferably, from 0.1 to 0.2 parts by weight.

In the case when the compounding ratio of the emulsifier is less than 0.05 parts by weight, the emulsification stability tends to become insufficient in comparison with a structure in which the compounding ratio of the polysiloxane is set within the above-mentioned range, while in the case when the compounding ratio of the emulsifier exceeds 0.4 parts by weight, a problem arises in which the degree of discoloration of paper becomes greater in comparison with a structure in which the compounding ratio of the polysiloxane is set within the above-mentioned range.

In addition to these, the anti-soiling agent composition of the present embodiment may contain additives, such as a chelating agent, a pH adjusting agent, an antiseptic agent, a viscosity adjusting agent, a lubricating agent, a wetting agent, a dusting inhibitor, a release agent, an adhesive agent, a surface modifying agent, a cleaning agent, a paper strength reinforcing agent, a sizing agent, a yield improving agent, a water repellent agent, an oil repellent agent, an anti-slipping agent, a lubricant, a softener, etc.

Examples of the lubricating agent include: mineral oils, such as gear oil, cylinder oil, turbine oil and spindle oil; plant oils, such as coconut oil, linseed oil, castor oil, rapeseed oil and corn oil; paraffins, such as fluidizing paraffin and iso-paraffin; and synthesized oils, such as polyisobutylene, polybutene, maleated polybutene, polyethylene wax and mirowax.

The following description will discuss a method of preparing an anti-soiling agent composition in accordance with the present embodiment.

The anti-soiling agent composition is prepared through processes in which a polysiloxane compound and an emulsifier are added to water and these are then stirred so that the polysiloxane compound is emulsified to produce the corresponding anti-soiling agent composition.

Such a stirring process is carried out by using a mixer, a homogenizer, a mill or the like, on demand.

The following description will discuss a method of using the anti-soiling agent composition on a dry part.

FIG. 1 is a schematic view that illustrates a dry part region of a dry part to which an anti-soiling agent composition in accordance with the present invention is applied.

As shown in FIG. 1, the anti-soiling agent composition is used for a dry part D.

The dry part D is provided with a paper body W, a plurality of cylinders D1, D2, D3, D4, D5, D6, D7 and D8 (hereinafter, referred to "D1 to D8"), each having a cylindrical shape, which are used for heating and drying the paper body W, canvases K1 and K2 for use in pressing the paper body onto the cylinders D1 to D8, a canvas roll KR that guides the canvases K1 and K2, breaker stack rolls B that gently adjust the flatness and paper thickness of the dried paper body W, and a calender roll C that adjusts the flatness and paper thickness of the dried paper body W.

In the dry part D, the paper body W is pressed onto the surfaces of the rotating cylinders D1 to D8 by the canvases K1 and K2. Thus, the paper body W is allowed to adhere to the cylinders D1 to D8 so as to be simultaneously heated and dried.

Thereafter, the paper body W is sandwiched by the breaker stack rolls B, and then made into a high-density state by the calender roll C.

In a using method of the anti-soiling agent composition, as shown in FIG. 1, to the cylinders D1 to D8, the canvases K1 and K2, the breaker stack roll B and the calender roll C of the dry part D, the anti-soiling agent composition is directly applied respectively at positions indicated by arrows A. In this case, the applying method of the anti-soiling agent composition is not particularly limited, and for example, by using a scatting nozzle or the like, a liquid-state shower system, a mist-state atomizing system or the like is used. At this time, the anti-soiling agent composition may be sprayed while the scattering nozzle is being slid in a paper width direction. By spraying the anti-soiling agent composition over the dry part, the pitch contamination can be prevented.

At this time, the sprayed amount of the anti-soiling agent composition per unit area of paper passing therethrough is preferably set in a range from 10 μg to 10000 μg/m$^2$, and more preferably from 30 μg to 1000 μg/m$^2$, as a solid component of the polysiloxane compound.

When the sprayed amount is less than 10 μg/m$^2$, the anti-soiling agent composition is not sufficiently adhered to the surface of the dry part region, with the result that the pitch adhesion is not sufficiently suppressed, in comparison with the structure in which the sprayed amount is set within the above-mentioned range. Moreover, when the sprayed amount exceeds 10000 μg/m$^2$, the excessive portion is accumulated on the surface of the dry part region, with the result that pitch is involved therein to increase stains and the meshes of the canvases tend to be clogged, in comparison with the structure in which the sprayed amount is set within the above-mentioned range.

Although preferred embodiments of the present invention have been explained above, the present invention is not limited by the above-mentioned embodiments.

For example, although the anti-soiling agent composition according to the present embodiment contains an emulsifier, the emulsifier is not necessarily required to be contained when the polysiloxane compound is water soluble.

In the anti-soiling agent composition according to the present embodiment, although the polysiloxane compound has methyl groups, some of the methyl groups may be substituted with an epoxy-modified group, an alkyl group (except for a methyl group), a polyether group, a carboxyl group or an aralkyl group. Only one kind of these may be included in a molecule, or a plurality of kinds thereof may be mixed therein.

Additionally, as the epoxy-modified group, an epoxy alkyl group or an epoxy polyether group is proposed.

In the anti-soiling agent composition according to the present embodiment, the anti-soiling agent compound is applied to the dry part region in the dry part; however, the composition may be applied not only to the dry part, but also to the press part and the reel part.

EXAMPLES

The following description will discuss the present invention in detail based upon examples and reference examples; however, the present invention is not limited by these examples below.

Examples 1 to 10

To water were added 10% by weight of a polysiloxane compound represented by the following formula (1) and 2.0% by weight of polyethylene decyl ether (emulsifier), and stirred by a mixer so that an anti-soiling agent composition was obtained.

As an amino-modified group in the polysiloxane compound, a substituent represented by the following formula (2) was used. Additionally, R$^1$ except for that of the amino-modified group represents a methyl group.

Table 1 shows amino-modified groups used.

[Formula 5]

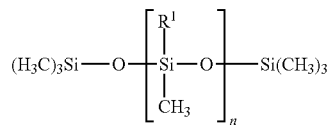

(1)

[Formula 6]

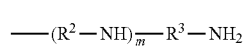

(2)

Comparative Example 1

The same processes as those of example 1 were carried out except that a polyether amino-group was used as an amino-modified group so that an anti-soiling agent composition was obtained.

Comparative Example 2

The same processes as those of example 1 were carried out except that a polyepoxy amino-group was used as an amino-modified group so that an anti-soiling agent composition was obtained.

TABLE 1

| | Polysiloxane compound | |
|---|---|---|
| | Number of repeating aminoalkylene units (m) | Substituent |
| Example 1 | 0 | R$^3$ = ethylene group |
| Example 2 | 1 | R$^2$ = methylene group, R$^3$ = ethylene group |
| Example 3 | 1 | R$^2$ = ethylene group, R$^3$ = ethylene group |
| Example 4 | 1 | R$^2$ = ethylene group, R$^3$ = propylene group |
| Example 5 | 1 | R$^2$ = propylene group, R$^3$ = methylene group |
| Example 6 | 1 | R$^2$ = propylene group, R$^3$ = ethylene group |
| Example 7 | 1 | R$^2$ = propylene group, R$^3$ = propylene group |
| Example 8 | 1 | R$^2$ = propylene group, R$^3$ = n-butylene group |
| Example 9 | 1 | R$^2$ = n-butylene group, R$^3$ = ethylene group |
| Example 10 | 2 | R$^2$ = propylene group, R$^2$ = propylene group, R$^3$ = ethylene group |

(Evaluation Method)

On the anti-soiling agent compositions obtained in examples 1 to 10 and comparative examples 1 and 2, cylinder evaluation 1, cylinder evaluation 2, canvas evaluation 1 and canvas evaluation 2 to be explained below were carried out.

In cylinder evaluation 1 and cylinder evaluation 2, supposing that the number n of repeating siloxane units of the polysiloxane compound represented by formula (1) is 300, evaluations were carried out, with the number of amino-modified groups per molecule of a polysiloxane compound being adjusted to 1.1 and the dynamic viscosity at 25° C. being adjusted to 1000 mm²/s.

In canvas evaluation 1 and canvas evaluation 2, supposing that the number n of repeating siloxane units of the polysiloxane compound represented by formula (1) is 130, evaluations were carried out, with the number of amino-modified groups per molecule of a polysiloxane compound being adjusted to 1.1 and the dynamic viscosity at 25° C. being adjusted to 250 mm²/s.

1. Cylinder Evaluation 1

Onto a cylinder D1 of a cylindrical dryer (dry part, made by Kobayashi Engineering Works., Ltd.) shown in FIG. 1, the anti-soiling agent compositions of examples 1 to 10 and comparative examples 1 and 2 were sprayed at a rate of 5 ml/min, and after having been operated for 8 hours, the weight of pitch dropped below the cylinder D1 was measured. The obtained results are shown in Table 2.

2. Cylinder Evaluation 2

A doctor blade is attached to the cylinder D3 of a cylindrical dryer shown in FIG. 1 so as to allow its blade edge to be made in contact with the surface thereof. Thus, when the cylindrical dryer was operated, pitch adhered to the cylinder D3 was scraped off and collected by the blade edge of the doctor blade.

Then, onto the cylinder D1, the anti-soiling agent compositions of examples 1 to 10 and comparative examples 1 and 2 were sprayed at a rate of 5 ml/min, and after having been operated for 8 hours, the weight of pitch accumulated on the blade edge of the doctor blade was measured. The obtained results are shown in Table 2.

3. Canvas Evaluation 1

Onto a canvas K1 of a cylindrical dryer shown in FIG. 1, anti-soiling agent compositions of examples 1 to 10 and comparative example 1 and 2 were sprayed at a rate of 5 ml/min, and the dryer was operated for one week.

Then, the number of adhered pitch spots having a diameter of 5 mm or more per 1 m² of the canvas K1 was measured. The obtained results are shown in Table 2.

4. Canvas Evaluation 2

Onto a canvas K1 of a cylindrical dryer shown in FIG. 1, anti-soiling agent compositions of examples 1 to 10 and comparative example 1 and 2 were sprayed at a rate of 5 ml/min, and the dryer was operated for one week.

Then, the pitch adhered to an out roll KR1 for guiding the canvas K1 were scraped off and the weight of the pitch was measured. The obtained results are shown in Table 2.

TABLE 2

| | Cylinder Evaluation 1 (g) | Cylinder Evaluation 2 (g) | Canvas Evaluation 1 (pieces) | Canvas Evaluation 2 (pieces) |
|---|---|---|---|---|
| Example 1 | 48.9 | 26.1 | 10 | 15.7 |
| Example 2 | 44.8 | 20.3 | 7 | 12.3 |
| Example 3 | 38.9 | 14.2 | 5 | 6.0 |
| Example 4 | 33.3 | 13.3 | 3 | 4.8 |
| Example 5 | 40.8 | 15.8 | 4 | 8.8 |
| Example 6 | 8.5 | 5.5 | 0 | 0.5 |
| Example 7 | 36.7 | 13.5 | 3 | 6.2 |
| Example 8 | 40.5 | 15.2 | 4 | 8.0 |
| Example 9 | 39.7 | 16.8 | 5 | 7.9 |
| Example 10 | 49.2 | 18.9 | 7 | 15.9 |
| Comparative Example 1 | 124.3 | 55.1 | 20 | 39.1 |
| Comparative Example 2 | 125.6 | 50.4 | 21 | 38.2 |

Examples 11 to 22 and Comparative Examples 3 to 8

To water were added 10% by weight of a polysiloxane compound represented by the aforementioned formula (1) and 2.0% by weight of polyethylene decyl ether (emulsifier), and stirred by a mixer so that an anti-soiling agent composition was obtained.

As an amino-modified group in the polysiloxane compound, a substituent represented by the following formula (3) was used. Additionally, $R^1$ except for that of the amino-modified group represents a methyl group.

Table 3 shows the number of amino-modified groups per molecule of the polysiloxane compound and the number of repeating siloxane units of the polysiloxane compound represented by the aforementioned formula (1) in each of examples and comparative examples.

[Formula 7]

$$-C_3H_6-NH-C_2H_4-NH_2 \qquad (3)$$

TABLE 3

| | Number of amino-modified groups | Number of repeating units (n) |
|---|---|---|
| Example 11 | 0.5 | 130 |
| Example 12 | 0.5 | 300 |
| Example 13 | 1.1 | 50 |
| Example 14 | 1.1 | 80 |
| Example 15 | 1.1 | 100 |
| Example 16 | 1.1 | 130 |
| Example 17 | 1.1 | 300 |
| Example 18 | 1.1 | 800 |
| Example 19 | 1.1 | 900 |
| Example 20 | 1.1 | 1000 |
| Example 21 | 2.5 | 130 |
| Example 22 | 2.5 | 300 |
| Example 23 | 3 | 130 |
| Example 24 | 3 | 300 |
| Example 25 | 5 | 130 |
| Example 26 | 5 | 300 |
| Comparative Example 3 | 0.3 | 130 |
| Comparative Example 4 | 0.3 | 300 |
| Comparative Example 5 | 1.1 | 40 |
| Comparative Example 6 | 1.1 | 1200 |
| Comparative Example 7 | 6 | 130 |
| Comparative Example 8 | 6 | 300 |

(Evaluation Method)

On the anti-soiling agent compositions obtained in examples 11 to 22 and comparative examples 3 to 8, the aforementioned cylinder evaluation 1, cylinder evaluation 2, canvas evaluation 1 and canvas evaluation 2 were carried out. The obtained results are shown in Table 4.

TABLE 4

| | Cylinder Evaluation 1 (g) | Cylinder Evaluation 2 (g) | Canvas Evaluation 1 (pieces) | Canvas Evaluation 2 (pieces) |
|---|---|---|---|---|
| Example 11 | 35.5 | 12.6 | 2 | 4.8 |
| Example 12 | 30.0 | 10.4 | 3 | 5.4 |
| Example 13 | 41.0 | 20.1 | 5 | 6.8 |
| Example 14 | 40.9 | 19.9 | 5 | 6.6 |
| Example 15 | 32.5 | 11.8 | 2 | 2.5 |

TABLE 4-continued

| | Cylinder Evaluation 1 (g) | Cylinder Evaluation 2 (g) | Canvas Evaluation 1 (pieces) | Canvas Evaluation 2 (pieces) |
|---|---|---|---|---|
| Example 16 | 25.4 | 5.0 | 0 | 0.7 |
| Example 17 | 7.5 | 4.5 | 1 | 3.5 |
| Example 18 | 29.6 | 8.8 | 2 | 5.2 |
| Example 19 | 36.1 | 16.3 | 5 | 7.9 |
| Example 20 | 37.5 | 17.6 | 6 | 8.2 |
| Example 21 | 32.0 | 10.2 | 2 | 4.9 |
| Example 22 | 28.0 | 9.4 | 4 | 5.9 |
| Example 23 | 43.2 | 15.0 | 5 | 7.4 |
| Example 24 | 40.7 | 13.5 | 6 | 8.4 |
| Example 25 | 48.2 | 22.5 | 9 | 11.0 |
| Example 26 | 47.0 | 20.1 | 10 | 11.8 |
| Comparative Example 3 | 128.0 | 66.4 | 15 | 35.5 |
| Comparative Example 4 | 119.5 | 60.0 | 16 | 40.2 |
| Comparative Example 5 | 124.3 | 50.1 | 18 | 35.1 |
| Comparative Example 6 | 120.6 | 48.4 | 21 | 37.2 |
| Comparative Example 7 | 105.4 | 54.1 | 21 | 35.5 |
| Comparative Example 8 | 89.9 | 50.3 | 25 | 37.3 |

The results indicate that the anti-soiling agent composition of the present invention makes it possible to sufficiently prevent pitch adhesion onto the dry part region.

INDUSTRIAL APPLICABILITY

The anti-soiling agent composition of the present invention is applied to a dry part region and used during paper-making processes. In accordance with the anti-soiling agent composition of the present invention, since the pitch adhesion onto the dry part region can be prevented, it is possible to efficiently improve the yield in the paper production.

DESCRIPTION OF THE SYMBOLS

B . . . Breaker stack roll
C . . . Calender roll
D . . . Dry part
D1, D2, D3, D4, D5, D6, D7, D8 . . . Cylinder
K1, K2 . . . Canvas
KR . . . Canvas roll
KR1 . . . Out roll
W . . . Paper body

The invention claimed is:

1. A method for preventing pitch contamination on cylinders, calendar roll, canvas and breaker stack roll of a paper-making machine comprising spraying onto their surfaces an anti-soiling composition comprising a polysiloxane compound, the polysiloxane compound being represented by the following formula (1),

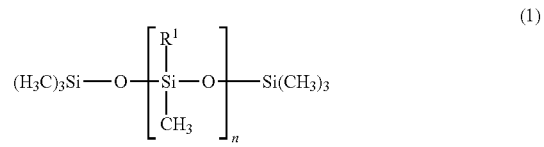

wherein a substituent $R^1$ represents a methyl group or an amino-modified group represented by the following formula (2), and the number n of repeating siloxane units represents an integer in a range from 100 to 800, and

wherein a substituent $R^2$ is a propylene group and a substituent $R^3$ is an ethylene group, and the number m of repeating amino-alkylene units represents an integer that is 1,
wherein the number of amino-modified groups per molecule of the polysiloxane compound is in a range from 0.5 to 5 so that a coat film is formed on a dry part region so as to disperse pitch, and the polysiloxane compound has a compounding ratio in a range from 0.1 to 40% by weight, and
wherein the polysiloxane compound of the anti-soiling composition is applied to the cylinders, calender roll, canvas, and breaker stack roll in an amount per unit area of paper passing therethrough of from 10 μg/m² to 10,000 μg/m².

2. The method according to claim 1, wherein the anti-soiling composition further comprises an emulsifier, wherein the compounding ratio of the emulsifier to one part by weight of the polysiloxane compound is in a range from 0.05 to 0.4 parts by weight.

3. The method according to claim 1, wherein the number of amino-modified groups per molecule of the polysiloxane compound is in a range from 0.5 to 3.

* * * * *